(12) United States Patent
Stifelman et al.

(10) Patent No.: US 9,830,039 B2
(45) Date of Patent: Nov. 28, 2017

(54) USING HUMAN WIZARDS IN A CONVERSATIONAL UNDERSTANDING SYSTEM

(71) Applicant: Microsoft Technology Licensing, LLC, Redmond, WA (US)

(72) Inventors: Lisa Stifelman, Palo Alto, CA (US); Dilek Hakkani-Tur, Los Altos, CA (US); Larry Heck, Los Altos, CA (US); Madhusudan Chinthakunta, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 389 days.

(21) Appl. No.: 13/784,449

(22) Filed: Mar. 4, 2013

(65) Prior Publication Data

US 2014/0250378 A1   Sep. 4, 2014

(51) Int. Cl.
*G06F 3/048* (2013.01)
*G10L 15/22* (2006.01)

(52) U.S. Cl.
CPC ............ *G06F 3/048* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 6,513,003 B1 | 1/2003 | Angell et al. | |
| 8,346,563 B1 | 1/2013 | Hjelm et al. | |
| 2005/0216264 A1* | 9/2005 | Attwater | G10L 15/22 704/239 |
| 2009/0119104 A1* | 5/2009 | Weng | G10L 15/22 704/244 |
| 2012/0173464 A1* | 7/2012 | Tur | G06F 9/4446 706/11 |
| 2012/0265531 A1 | 10/2012 | Bennett | |
| 2012/0278073 A1 | 11/2012 | Weider et al. | |
| 2013/0185081 A1* | 7/2013 | Cheyer | G06F 17/3087 704/275 |

OTHER PUBLICATIONS

Schlogl, et al., "Supporting the Wizard: Interface Improvements in Wizard of Oz Studies", In Proceedings of the 25th BCS Conference on Human-Computer Interaction, Jul. 4, 2011, 6 pages.

(Continued)

*Primary Examiner* — William Trapanese

(57) ABSTRACT

A wizard control panel may be used by a human wizard to adjust the operation of a Natural Language (NL) conversational system during a real-time dialog flow. Input to the wizard control panel is detected and used to interrupt/change an automatic operation of one or more of the NL conversational system components used during the flow. For example, the wizard control panel may be used to adjust results determined by an Automated Speech Recognition (ASR) component, a Natural Language Understanding (NLU) component, a Dialog Manager (DM) component, and a Natural Language Generation (NLG) before the results are used to perform an automatic operation within the flow. A timeout may also be set such that when the timeout expires, the conversational system performs an automated operation by using the results shown in the wizard control panel (edited/not edited).

20 Claims, 8 Drawing Sheets

(56) References Cited

OTHER PUBLICATIONS

Goh, et al., "A Multilevel Natural Language Query Approach for Conversational Agent Systems", In Journal of IAENG International Computer Science, Feb. 13, 2007, 7 pages.
Dow, et al., "Eliza meets the Wizard-of-Oz: Blending Machine and Human Control of Embodied Characters", In Proceedings of the SIGCHI Conference on Human Factors in Computing Systems, Apr. 10, 2010, 10 pages.
Kruijff-Korbayova, et al., "Spoken Language Processing in a Conversational System for Child-Robot Interaction", In Proceedings of the 3rd Workshop on Child, Computer and Interaction, Sep. 2012, 8 pages.
Cerezo, et al., "Affective Embodied Conversational Agents for Natural Interaction", IIn Journal of Computer and Information Science, May 1, 2008, 27 pages.
"International Search Report & Written Opinion for PCT Application No. PCT/US2014/019141", dated Jul. 7, 2014, Filed Date: Feb. 27, 2014, 10 Pages.
Schlögl, et al., "WebWOZ: A Wizard of Oz Prototyping Framework", In Proceedings of the 2nd ACM SIGCHI Symposium on Engineering Interactive Computing Systems, Jun. 2010, pp. 109-114.
"Second Written Opinion Issued in PCT Patent Application No. PCT/US2014/019141", dated Jan. 22, 2015, 4 Pages.
Lambourne, et al., "Speech-Based Real-Time Subtitling Services", In International Journal of Speech Technology, vol. 7, Issue 4, Oct. 1, 2004, 20 Pages.

\* cited by examiner

USING HUMAN WIZARDS IN A CONVERSATIONAL UNDERSTANDING SYSTEM

BACKGROUND

Dialog systems are continually evolving to handle less constrained spoken input, interpret user intent, and engage in natural dialog to accomplish complex tasks. Wizard systems using one or more human "wizards" may be used to simulate a fully automated experience in a dialog system to assist in early user studies and data collection before the dialog system is completed. For example, when simulating a speech system, a human wizard may be used behind the scenes to transcribe the user's speech rather than using an actual speech recognition system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A wizard control panel may be used by a human wizard to adjust the operation of a Natural Language (NL) conversational system during a real-time dialog flow. Input to the wizard control panel is detected and used to interrupt/change an automatic operation of one or more of the NL conversational system components used during the flow. For example, the wizard control panel may be used to adjust results determined by an Automated Speech Recognition (ASR) component, a Natural Language Understanding (NLU) component, a Dialog Manager (DM) component, and a Natural Language Generation (NLG) before the results are used to perform an automatic operation within the flow. The results adjusted using the wizard control panel include operations such as: correcting an utterance detected by the ASR component; skipping a detected utterance (e.g. addressee detection); requesting a user to repeat an utterance; indicate that the conversational system does not know how to perform a request; adjust/correct NL understanding (e.g. domains/slots/values, . . . ); adjust NL feedback delivered to the user; execute actions/commands (e.g. shortcuts); submit/correct information as determined by the system; and the like. The wizard control panel may also be used to monitor/control actions that occur on a user's display. For example, in response to a wizard seeing a user performing a gesture, the wizard may select an appropriate control/ command using the wizard control panel (or let the gesture be determined and performed by the system). One or more timeouts may also be set such that when the timeout expires, the conversational system performs an automated operation by using the results shown in the wizard control panel (edited/not edited). For example, each component within the conversational system may be set to a same timeout value and/or different timeout value.

DETAILED DESCRIPTION

Figure 1:
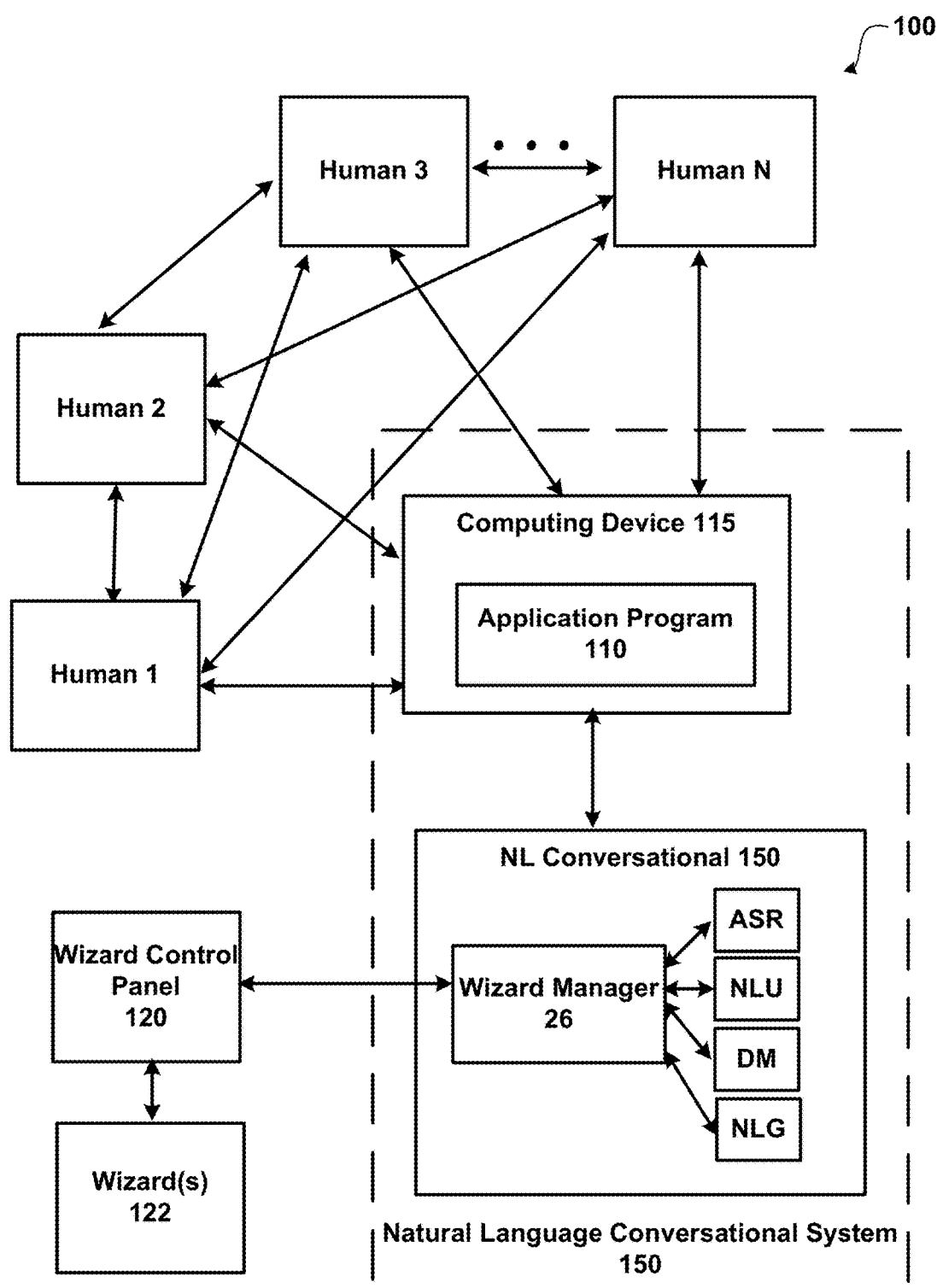
FIG. 1 shows a natural language conversational system including a wizard control panel.

Referring now to the drawings, in which like numerals represent like elements, various embodiment will be described.

FIG. 1 shows a natural language conversational system including a wizard control panel. As illustrated, system 100 includes computing device 115, and Natural Language (NL) conversational system 150 comprising a wizard manager 26 coupled to wizard control panel 120 used by one or more wizards 122, with one or more humans (e.g. humans 1-N) that may interact with each other and/or the conversational system. One or more computing devices/recording devices may be used to receive input (e.g. speech input) from one or more users. Conversational system 150 may be implemented as an online service, an service/application residing on one or more computing devices and/or a combination.

According to an embodiment, one or more humans (e.g. humans 1-N) may interact jointly with the conversational system using unconstrained natural language. Wizard manager 26 is configured to assist one or more human wizards 122 fill in gaps in a natural language conversational system using wizard control panel 120.

According to one embodiment, application 110 is a multimodal application that is configured to receive speech input and/or input from a touch-sensitive input device 115 and/or other input devices. For example, speech input, keyboard input (e.g. a physical keyboard and/or SIP), text input, video based input, and the like. Application 110 may also provide multimodal output (e.g. speech, graphics, vibrations, sounds, . . . ). Wizard manager 26 may provide information to/from application 110 in response to user input (e.g. speech/gesture). For example, a user may say a phrase (e.g. an utterance) to identify a task to perform by application 110 (e.g. selecting a movie, buying an item, identifying a product, . . . ). Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like. Gestures may include touch input and non-touch input. A user may directly contact a touch surface and/or perform a gesture without touching a touch surface. For example, a user may point to an object, position an arm in a certain position (e.g. stop sign, wave, . . . ), and the like.

System 100 as illustrated may comprise zero or more touch screen input device/display that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that are in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Conversational systems, such as conversational system 150, are continually evolving to handle less constrained spoken input, interpret user intent, and engage in natural dialog to accomplish complex tasks. Conversational system 150 is configured to interact with wizard manager 26 that utilizes wizard control panel 120 to perform actions within the flow of the conversational system 150.

One or more recording devices may be used to detect speech and receive video/pictures (e.g. MICROSOFT KINECT, microphone(s), and the like).

Wizard control panel 120 coupled to wizard manager 26 may be used by a human wizard to adjust the operation of a Natural Language (NL) conversational system 150 during a real-time dialog flow. Input to the wizard control panel is detected by wizard manager 26 and used to interrupt/change an automatic operation of one or more of the NL conversational system components used during the flow. For example, wizard control panel 120 may be used to adjust results determined by an Automated Speech Recognition (ASR) component, a Natural Language Understanding (NLU) component, a Dialog Manager (DM) component, and a Natural Language Generation (NLG) before the results are used to perform an automatic operation within the flow. The results adjusted using the wizard control panel 120 include operations such as: correcting an utterance detected by the ASR component; skipping a detected utterance (e.g. addressee detection); requesting a user to repeat an utterance; indicate that the conversational system does not know how to perform a request; adjust/correct NL understanding (e.g. domains/slots/values, . . . ); adjust NL feedback delivered to the user; execute actions/commands (e.g. shortcuts); submit/correct information as determined by the system; and the like. The wizard control panel may also be used to monitor/control actions that occur on a user's display. For example, in response to a wizard seeing a user performing a gesture, the wizard may select an appropriate control/command using the wizard control panel (or let the gesture be determined and performed by the system). One or more timeouts may also be set such that when the timeout expires, the conversational system performs an automatic operation by using the results shown in the wizard control panel (edited/not edited). For example, each component within the conversational system may be set to a same timeout value and/or different timeout value. An overall timeout may also be used that is a timeout value for the all/portion of the components combined instead of and/or in addition to a timeout value for each of the components. More details are provided below.

Figure 2:
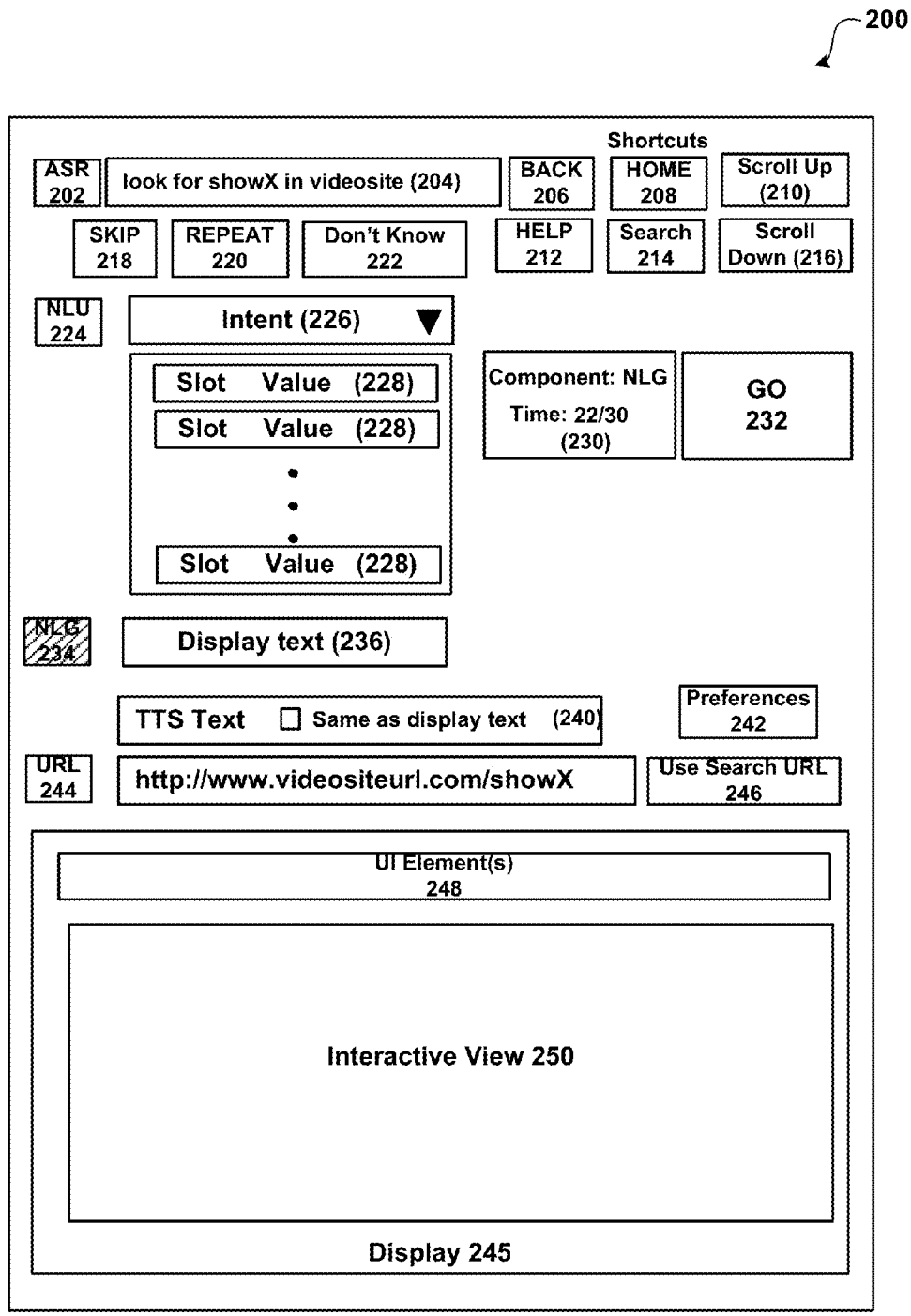
FIG. 2 shows a display of an exemplary wizard control panel.

FIG. 2 shows a display of an exemplary wizard control panel.

As illustrated, wizard control panel 200 includes Graphical User Interface (GUI) elements for affecting an automatic operation for: ASR (202, 204), Skip 218, Repeat 220, Don't Know 222; Shortcuts (Back 206, Home 208, Scroll Up 210, Help 212, Search 214, Scroll Down (216); NLU 224 (Intent 226, Slot(s)/Value(s) 228); Timer 230; Go 232; NLG 234 (236, 238, 240); Preferences 242; URL 244, Use Search URL 246 and Display 245 including an interactive view 250 and UI elements 248 for display 245. While the elements are displayed in a particular order within the wizard control panel, the elements may be displayed in other orders/other windows according to other embodiments. For example, the wizard control panel may change based on the component currently active in the flow (e.g. a first display for ASR, a second display for NLU, a third display for NLG, and the like).

Wizard control panel 200 may be used by a human wizard to adjust the operation of a Natural Language (NL) conversational system during a dialog flow. While a user/users are interacting with the conversational system, the wizard control panel 200 is updated to reflect the current flow.

When the ASR component of the conversational system detects an utterance, the utterance is displayed in element 204. The wizard (using wizard control panel 200) may change the detected speech (e.g. edit the content within element 204), skip the turn by selecting element 218 (e.g. addressee detection—utterance was falsely detected), ask the user to repeat their utterance by selecting repeat 220 or decline the specified request by selecting the don't know element 222 (e.g. request not supported by conversational system). According to an embodiment, a timer 230 shows a current amount of time before the results automatically provided by the component are used. In the ASR example, if the wizard does not make a change/selection, then the text 204 as recognized by the ASR component is used. The wizard may also select the GO element 232 at any point to submit the results as shown in wizard control panel 200 (e.g. edited/not edited) at any time before expiration of the timer.

When the NLU component 224 of the conversational system processes the input, an intent element 226 and associated slot(s)/value(s) 228 are updated to reflect the results determined by the NLU component. A wizard may change the determined intent/slot/value(s) within the predetermined time period. For example, the wizard may change zero or more of the determined slots and values that are displayed. A wizard may also add one or more additional slot/values and/or delete one or more of the displayed slot/values. In the current example, the Intent would be displayed as "Navigate" as the request is to "look for showX in videosite" While the current intent is shown, the wizard control panel may also be configured to display current intent(s)/slot/values as being maintained by the Dialog Manager (DM). Timer 230 shows a current amount of time before the results automatically provided by the NLU component are used. An overall timer may also be displayed. The overall timer may be used that is a timeout value for the all/portion of the components combined instead of and/or in addition to a timeout value for each of the components.

When the NLG component 234 of the conversational system processes the input, the NLG output 238 is updated to reflect the results determined by the NLG component. A wizard may change the determined NLG value within the predetermined time period. A wizard may also change the Text-To-Speech (TTS) text output using element 240. Timer 230 shows a current amount of time before the results automatically provided by the NLG component are used.

Shortcuts may also be included in the wizard control panel. The shortcuts are common actions requested to be performed by a user/wizard. According to an embodiment, the shortcuts are configurable. For example, in the current example relating to browsing the shortcuts include a back 206 element, a home 208 element, a help 212 element, a search 214 element, a scroll up 210 element and a scroll down 216 element. Another application may use different shortcuts (e.g. a music application may include shortcuts relating to navigating songs, . . . ). Wizard may select a shortcut to quickly perform the requested action. For example, a user may say "back" but the system does not recognize it correctly. Instead of correcting the value in 204 and waiting for the flow to complete, the wizard may select the "back" shortcut to immediately execute the shortcut.

Display 245 is used to show a current state of what is seen by a user. According to an embodiment, the wizard is configured to receive input events associated with the user's display. For example, if the user moves a cursor, the movement is shown in interactive view 250. The wizard may also control the user's display. For example, the wizard may select an entity, change the view displayed (e.g. go to a new page, etc.). The interactive view 250 may also be used by the wizard to view/hear what the user is currently gesturing/saying. For example, the user could say "play the third movie" and the wizard could hear that utterance and execute that action. As another example, a user may say "play that movie" while pointing at a movie on the display. The wizard can see the output of the gesture using interactive view 250 (e.g. the pointing) to know which movie the user is pointing to and the wizard may select the correct movie (or let the automated system handle). The use of the wizard may make it appear to a user that the system is automated even though some of the system may not yet be automated. The wizard may also select elements within display 245 such that they are activated on the user(s) display. For example, a wizard may select an element from UI element(s) 248 to update the display 245 and the user(s) corresponding display.

Figure 3:
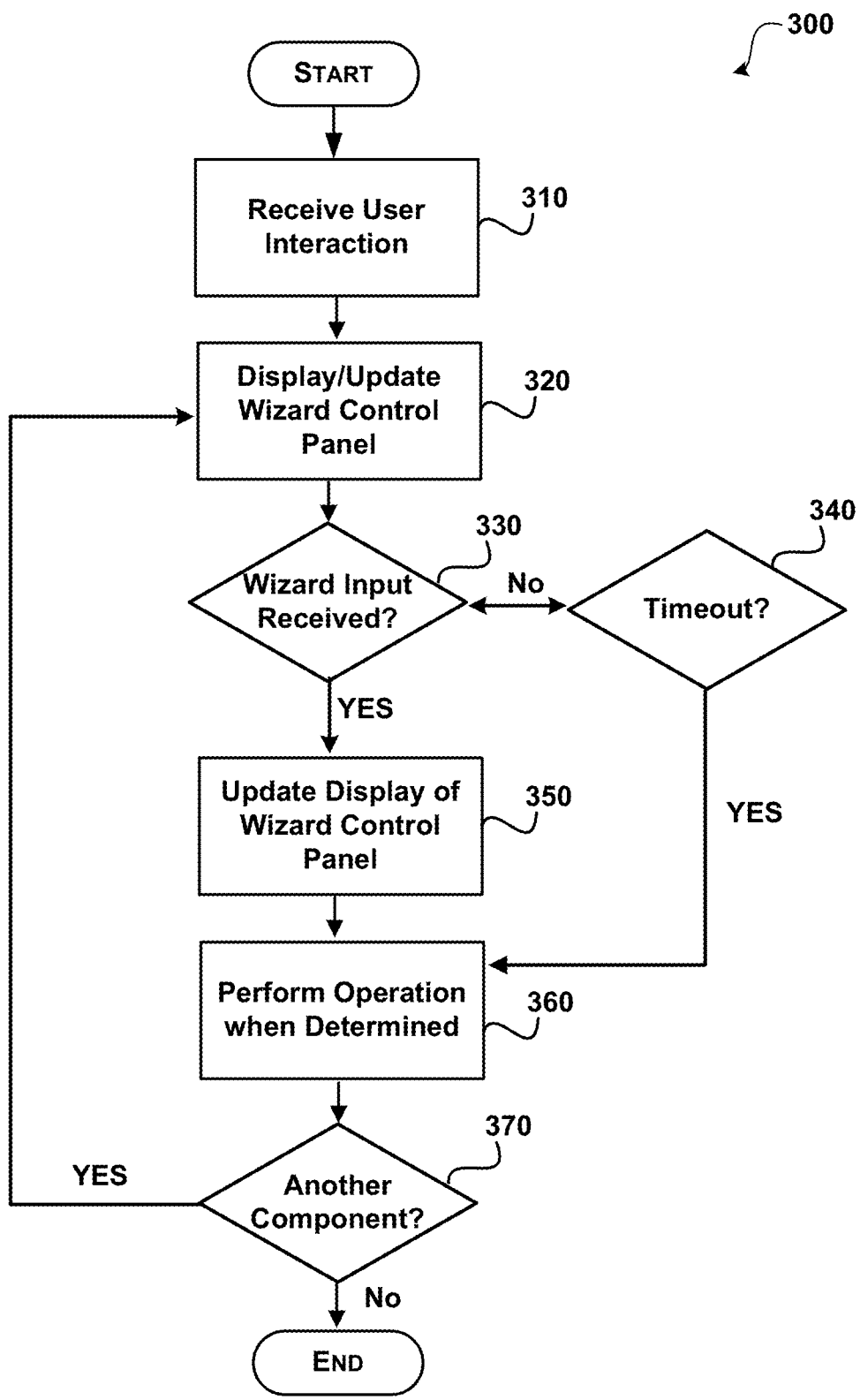
FIG. 3 shows an illustrative process for using a wizard control panel in a conversational understanding system.

FIG. 3 shows an illustrative process for using a wizard control panel in a conversational understanding system. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process moves to operation 310, where a user interaction with a conversational system is received. The user interaction may be received from a multimodal interface. For example, the user interaction may be speech input (e.g. an utterance), a gesture, gaze, a text input, a touch selection, keyboard input, mouse input, and the like. An utterance may be a complete sentence, a portion of a sentence, a complete/partial command, and the like.

Flowing to operation 320, a wizard control panel is displayed or updated with current information when already displayed. The wizard control panel is used by a human wizard to adjust the operation of a Natural Language (NL) conversational system during a real-time dialog flow between a user and the conversational system. As discussed, the wizard control includes different graphical user interface elements that are used to interrupt and adjust results before the operation is automatically performed by the NL conversational system. Generally, the wizard and the dialog operations operate in a parallel way. When the wizard is used to make a change in the intermediate system interpretation (for example a wizard corrects ASR output), then the system takes over from that point on, and NLU interprets the corrected ASR output, and the DM performs the rest of the interpretation or action decision accordingly, The wizard may continue to be used to make changes in other steps, and when a change is made, the wizard interrupts the flow (e.g. correct NLU output), and the system continues processing from that point on. According to an embodiment, the wizard control panel includes GUI elements for adjusting operation of an Automated Speech Recognition (ASR) component, a Natural Language Understanding (NLU) component, a Dialog Manager (DM) component, and a Natural Language Generation (NLG) of the conversational system. The wizard control panel may be configured to adjust operations for more/fewer components. Preferences may be received from an authorized user to configure the operations adjustable by a wizard using the wizard control panel.

Moving to decision operation 330, a determination is made as to whether input to the wizard control panel is received. For example, a selection may be made, displayed text may be changed/inputted, and/or some other operation involving the wizard control panel is received. When input is received, the process flows to operation 350. When input is not received, the process moves to decision operation 340.

At decision operation 340, a determination is made as to whether a timeout has occurred. The timeout is a predetermined time limit at which point the conversational system automatically performs the operations using the results automatically determined by the component or uses the results changed using the wizard control panel. According to an embodiment, a time indication (e.g. time left/expired) is displayed such that the human wizard may readily determine how much time they have to adjust/correct the current component. For example, if the ASR component indicates the recognized speech within a text box, the user may have a predetermined number of seconds to correct the determined speech. If the user does not correct the determined speech, then a timeout occurs and the conversational system uses the speech automatically determined from the ASR component. When a timeout has not occurred, the flow returns to decision operation 330. When a timeout has occurred, the process moves to operation 360.

Transitioning to operation 350, the display of the wizard is updated to reflect the input received.

Flowing to operation 360, the operation is performed when determined. When the wizard utilizes the wizard control panel before the timeout period, the user determined value/selection is used when performing the operation (e.g. changed NLG text, selection of a shortcut, corrected speech, request the user to repeat the interaction, and the like). When the wizard control panel is not utilized by the wizard before the timeout period, the results automatically determined by the conversational system are used (e.g. the automatically determined speech/intent/slots/values/NLG, and the like) are performed. According to an embodiment, the wizard may select a "GO" GUI element to submit the information as determined from the conversational system. For example, the wizard may see that the speech is recognized correctly and select the GO" GUI element in order to avoid waiting for the timeout to expire.

Flowing to decision operation 370, a determination is made as to whether there are any more components in the flow. For example, after the ASR component completes, the next component may be an NLU component that determines an intent/slot/values based on the user interaction. According to an embodiment, the flow moves from an ASR component to an NLU component to an NLG component. While the DM component is not specifically included, changes to one or more of the components affect operation of the DM component. The DM component has many functions. The DM is used to control the flow of operations; interpret NLU output in context (sometimes overrides); interact with the backend knowledge sources (such as a structured database, a knowledge graphs or the web); and decide on the next action to perform (for example, ask the user for a clarification). Some of the actions included on the wizard interface (e.g. Don't Know) are also typically jobs of the DM. For example, the DM may determine that it "Doesn't know" how to perform an action after the ASR component and the NLU component run, but the wizard can quickly decide on such actions before waiting for the DM to respond. Depending on the type of the system and the complexity of the actions, DM actions, as well as other actions, not currently shown in the wizard interface may be included in the wizard interface. Generally, decisions from any interpretation or decision component may be included in the wizard interface and can be overridden by the wizard. When there is a another component in the flow, the process moves to operation 320. When there is not a another component in the flow, the process moves to an end operation returns to processing other actions.

Figure 4:
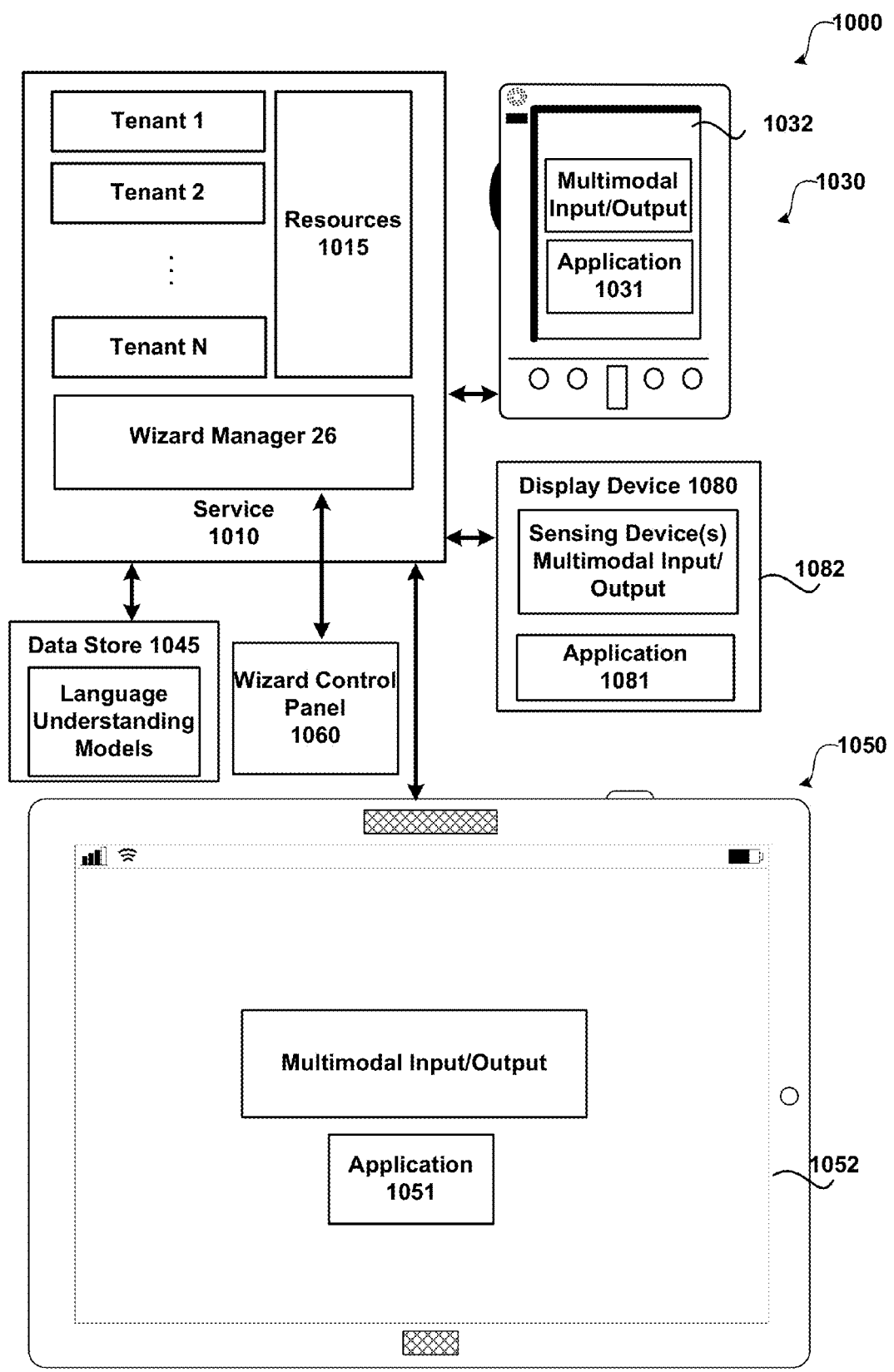
FIG. 4 illustrates an exemplary system that uses a human wizard in a conversational understanding system.

FIG. 4 illustrates an exemplary system that uses a human wizard in a conversational understanding system. As illustrated, system 1000 includes wizard control panel 1060, service 1010, data store 1045, touch screen input device/display 1050 (e.g. a slate) smart phone 1030, and display device 1080 (e.g. monitor/television, . . . ).

Each device (e.g. device 1050, smart phone 1030, display device) may be configured to receive input from one or more sensing devices. The sensing device may be a part of the device and/or separate from the device. The sensing device may be configured to capture user input using various input methods, A sensing device may include one or more microphones to capture spoken input (e.g. words) and one or more cameras to detect movement of a user (e.g. pictures/videos). The sensing device may also be configured to capture other inputs from a user such as by a keyboard and/or mouse (not pictured). For example, the sensing device may be a MICROSOFT KINECT® device comprising a plurality of cameras and a plurality of microphones As illustrated, service 1010 is a cloud based and/or enterprise based service that may be configured to provide services that receive multimodal input including utterances to interact with the service, such as services related to various applications (e.g. games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output and/or sound effects. Functionality of one or more of the services/applications provided by service 1010 may also be configured as a client/server based application.

As illustrated, service 1010 is a multi-tenant NL conversational service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micromachined accelerometers, piezoelectric devices, capacitive sensors, resistive sensors, inductive sensors, laser vibrometers, and LED vibrometers.

According to an embodiment, smart phone 1030, touch screen input device/display 1050 and display device 1080 are configured with multimodal applications (1031, 1051, 1081). While the application is illustrated as part of the device, the application may be a network application (e.g. included as part of service 1010) that is stored externally from the device.

As illustrated, touch screen input device/display 1050 and smart phone 1030 shows exemplary displays 1052/1032/1082 showing the use of an application that utilize multimodal input/output (e.g. speech/graphical displays/gestures (touch/non-touch)). Data may be stored on a device (e.g. smart phone 1030, slate 1050 and/or at some other location (e.g. network data store 1045). Data store 1054 may be used to store models used by the language understanding system. The applications used by the devices may be client based applications, server based applications, cloud based applications and/or some combination.

Wizard manager 26 is configured to perform operations relating to using human wizards and wizard control panel 1060 as described herein. While manager 26 is shown within service 1010, the all/part of the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
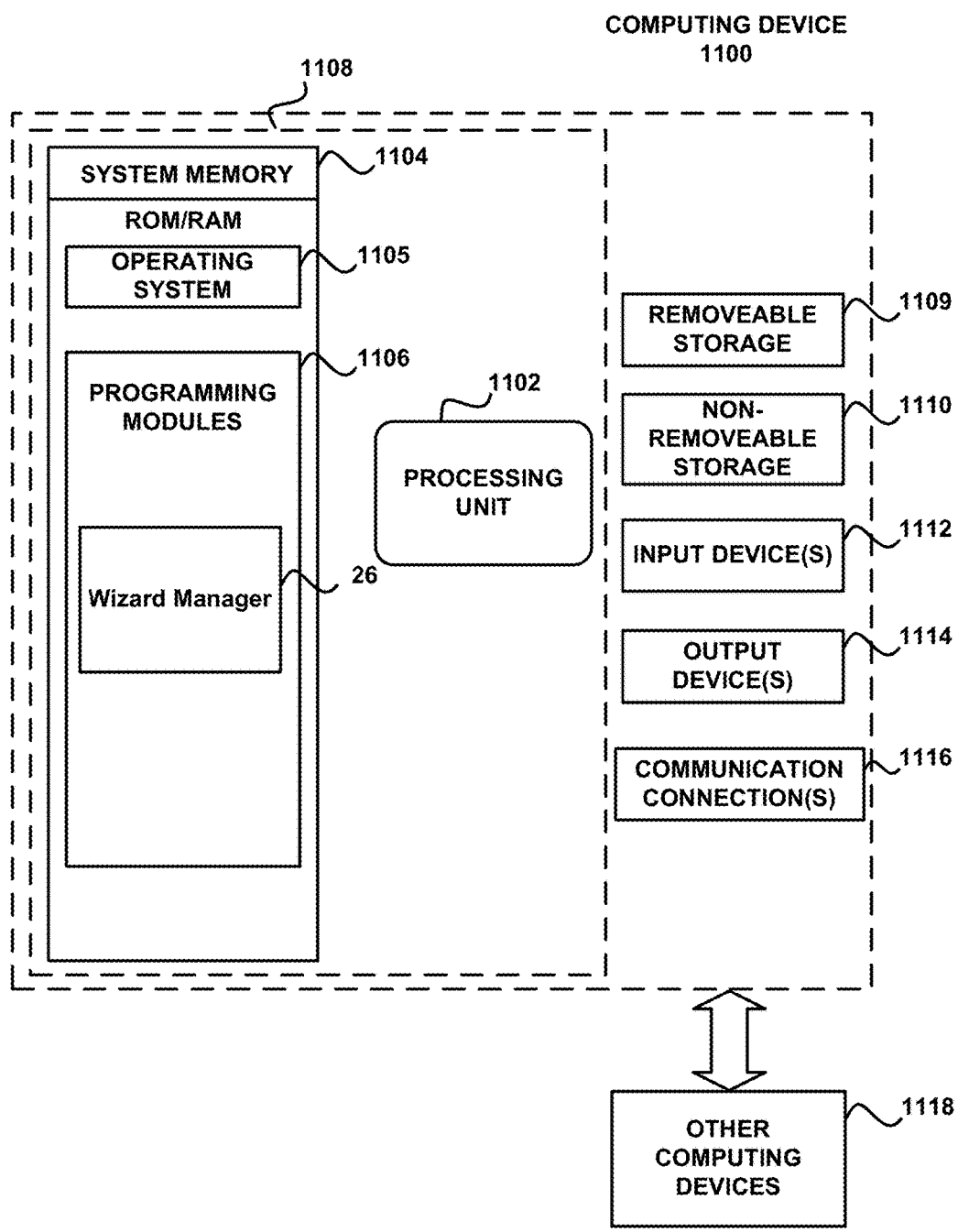
FIGS. 5, 6A, 6B, and 7 and the associated descriptions provide a discussion of a variety of operating environments in which embodiments of the invention may be practiced.
Figure 6A:
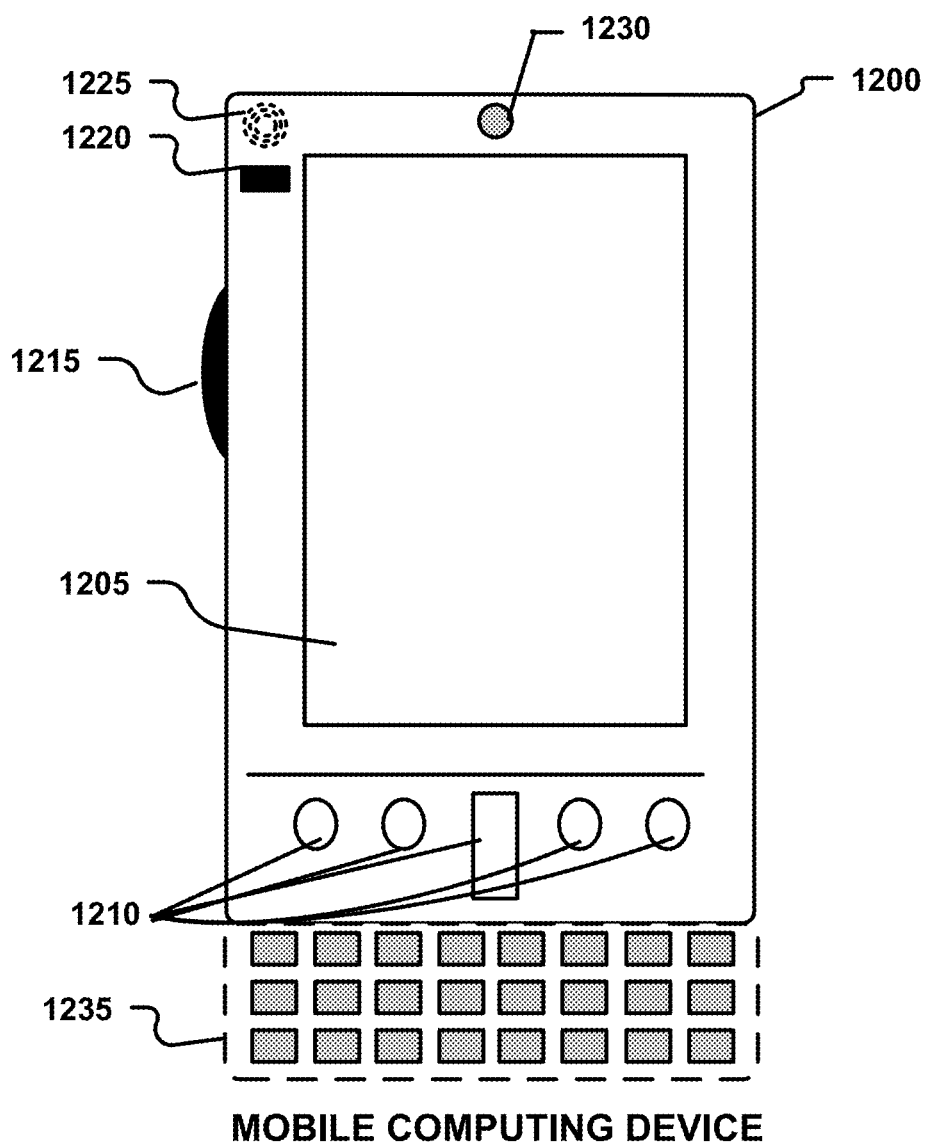
Figure 6B:
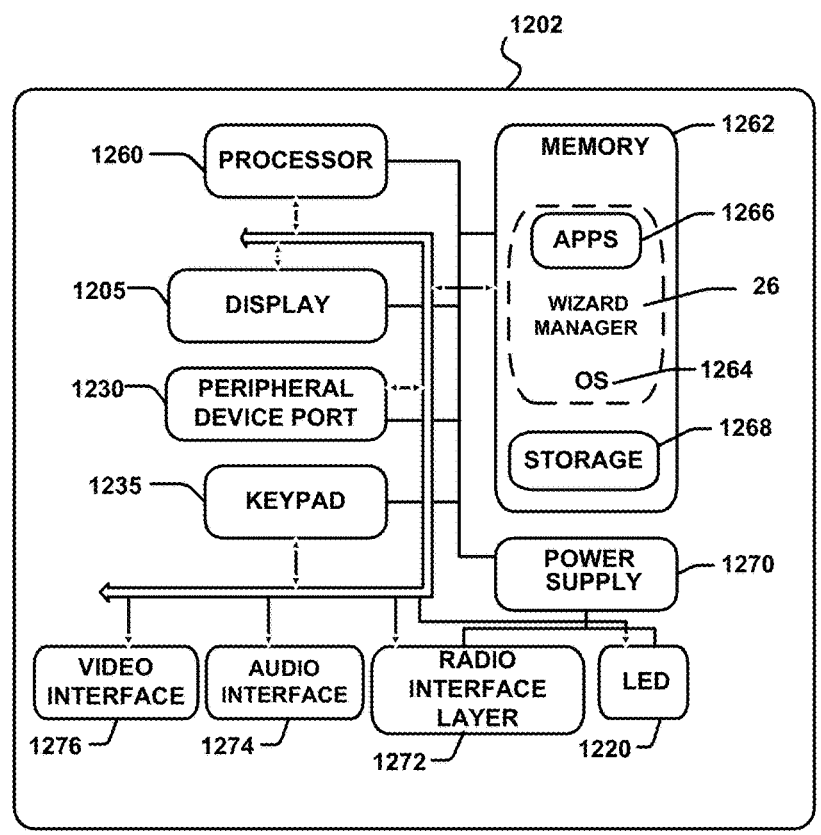
Figure 7:
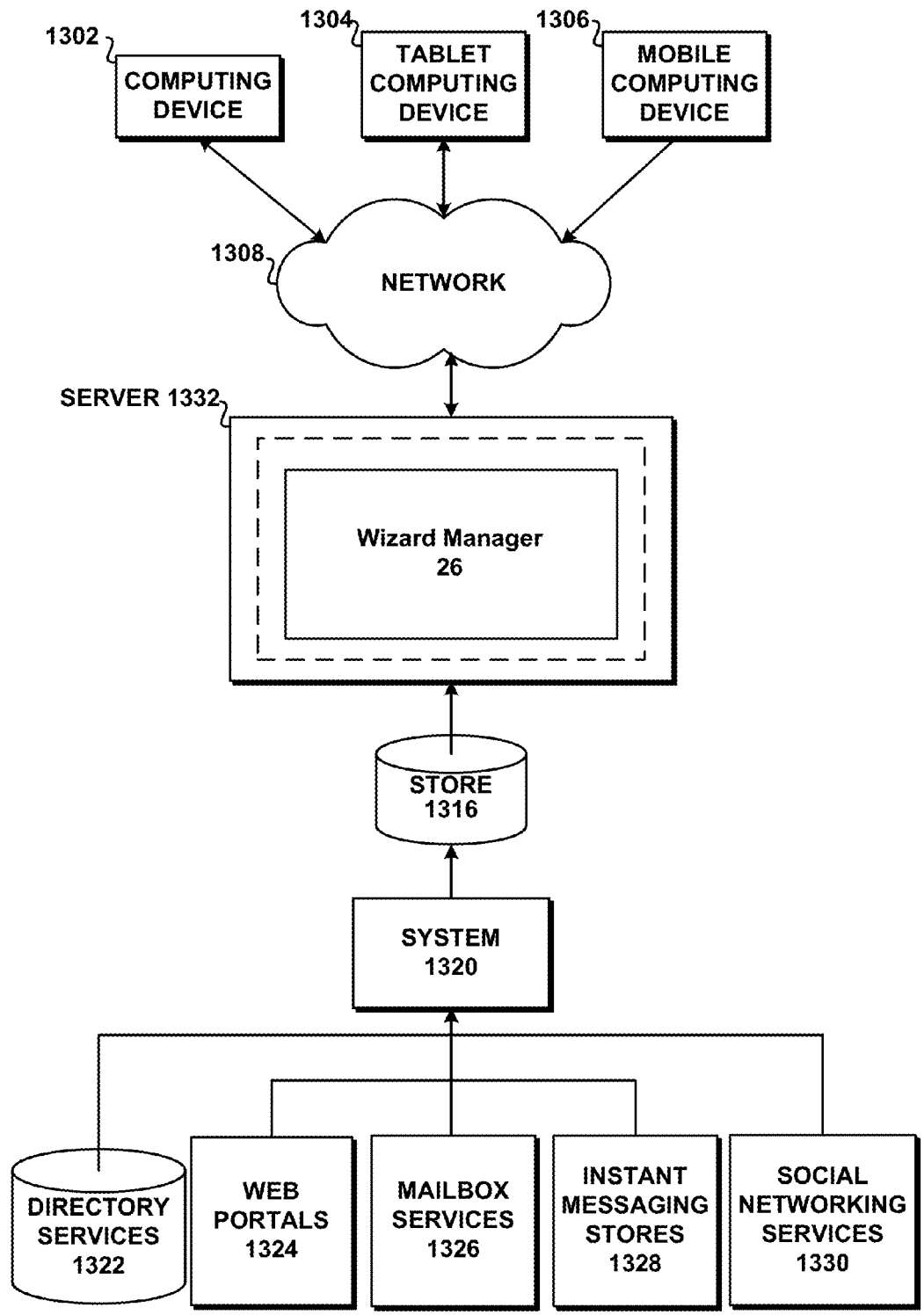

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a wizard manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 5 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile telephone, a smartphone, a tablet personal computer, a laptop computer, and the like, with which embodiments of the invention may be practiced. With reference to FIG. 6A, an example mobile computing device 1200 for implementing the embodiments is illustrated. In a basic configuration, mobile computing device 1200 is a handheld computer having both input elements and output elements. Input elements may include touch screen display 1205 and input buttons 1210 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1210. Mobile computing device 1200 may also include an optional keypad 1235. Optional keypad 1235 may be a physical keypad or a "soft" keypad generated on the touch screen display.

Mobile computing device 1200 incorporates output elements, such as display 1205, which can display a graphical user interface (GUI). Other output elements include speaker 1225 and LED 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 6B is a block diagram illustrating components of a mobile computing device used in one embodiment, such as the computing device shown in FIG. 6A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the wizard manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone to receive audible input, such as to facilitate a telephone conversation. In accordance with embodiments of the present invention, the microphone may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 9B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture for a system as described herein.

Components managed via the wizard manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to human wizards in a conversational understanding system. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for using a wizard control panel in a conversational system, comprising:
receiving a user interaction with the conversational system during a dialog flow;
receiving information associated with graphical entities of a user's display;
displaying the wizard control panel including a display of elements that are used for affecting an automatic operation of the conversational system during the dialog flow and a display of a representative state of the user's display for interacting with the user's display by a human wizard;
processing the user interaction to display results for the user interaction within the wizard control panel;
determining receipt of an update to the results in the wizard control panel; and
in response to determining the results are updated in the wizard control panel, submitting updated results to the conversational system, wherein submission of the updated results modifies operation of the conversational system before the automatic operation is processed.

2. The method of claim 1, wherein displaying the wizard control panel, comprises: displaying text that is automatically recognized by an input recognition component of the conversational system within an element of the wizard that is changeable.

3. The method of claim 1, wherein displaying the wizard control panel, comprises: displaying a Natural Language Understanding element of the wizard that is configured for: viewing an intent and changing the intent; displaying a slot and a value and changing the slot and the value; wherein the Natural Language Understanding element is populated using results determined by an input understanding component of the conversational system.

4. The method of claim 1, wherein displaying the wizard control panel, comprises: displaying a Natural Language Generation element of the wizard that is configured for viewing and changing feedback that is populated using results automatically determined by an input understanding component of the conversational system.

5. The method of claim 1, wherein displaying the wizard control panel, comprises: displaying shortcut elements that when selected instruct the conversational system to perform a command.

6. The method of claim 1, wherein displaying the wizard control panel, comprises: displaying a timer that indicates an amount of time left before the conversational system automatically performs actions using results currently shown in the wizard control panel.

7. The method of claim 1, wherein displaying the wizard control panel, comprises: displaying a skip element that when selected instructs the conversational system to ignore the user interaction.

8. The method of claim 1, wherein displaying the wizard control panel, comprises: displaying a repeat element that when selected instructs the conversational system to request a user to repeat the user interaction; and an unknown element that when selected instructs the conversational system to ignore the user interaction as unknown.

9. The method of claim 1, wherein submission of the updated results further comprises transmitting a control action to manipulate an entity on the user's display.

10. A computer-readable hardware storage device storing computer-executable instructions that, when executed on a processor, causes the processor to perform a method comprising:
    receiving a user interaction with a conversational system during dialog flow processing;
    receiving information associated with graphical entities of a user's display;
    displaying a wizard control panel including a display of elements that are used for affecting an automatic operation of the conversational system during the dialog flow processing and a display of a representative state of the user's display for interacting with the user's display by a human wizard;
    processing the user interaction to display results for the user interaction within the wizard control panel;
    displaying a timer that indicates an amount of time left of a predetermined time before the conversational system executes the automatic operation using results currently shown in the wizard control panel;
    determining when an input is received into the wizard control panel within the predetermined time, wherein the input updates the results displayed in the wizard control panel; and
    in response to determining that the input is received into the wizard control panel, submitting updated results based on the input, wherein the updated results modifies operation of the conversational system before the automatic operation is processed.

11. The computer-readable hardware storage device of claim 10, wherein displaying the wizard control panel, comprises: displaying text that is automatically recognized by an input recognition component of the conversational system within an element of the wizard that is changeable.

12. The computer-readable hardware storage device of claim 10, wherein displaying the wizard control panel, comprises: displaying a Natural Language Understanding element of the wizard that is configured for: viewing an intent and changing the intent; displaying a slot and a value and changing the slot and the value; wherein the Natural Language Understanding element is populated using results determined by an input understanding component of the conversational system.

13. The computer-readable hardware storage device of claim 10, wherein displaying the wizard control panel, comprises: displaying a Natural Language Generation element of the wizard that is configured for viewing and changing feedback that is populated using results automatically determined by an input understanding component of the conversational system.

14. The computer-readable hardware storage device of claim 10, wherein displaying the wizard control panel, comprises: displaying shortcut elements that when selected instruct the conversational system to perform a command comprising one or more of: a back command, a help command, a home command, a scroll up command, a scroll down command, and a search command.

15. The computer-readable hardware storage device of claim 10, wherein displaying the wizard control panel, comprises: displaying one or more of: a skip element that when selected instructs the conversational system to ignore the user interaction; a repeat element that when selected instructs the conversational system to request a user to repeat the user interaction; and an unknown element that when selected instructs the conversational system to ignore the user interaction as unknown.

16. The computer-readable storage device of claim 10, wherein submission of the updated results further comprises transmitting a control action to manipulate an entity on the user's display.

17. A system for using a wizard control panel in a natural language (NL) conversational system, comprising:
    at least one processor;
    a display; and
    a memory operatively connected with the at least one processor, the memory storing instructions, that when executed on the at least one processor, causes the at least one processor to perform operations comprising:
    receiving a user interaction with the NL conversational system during processing of a dialog flow;
    receiving graphical entities from a user's display;
    displaying the wizard control panel comprising a display of a representative state of the user's display for interacting with the user's display by a human wizard;
    processing the user interaction to display results for the user interaction within the wizard control panel and display the graphical entities;
    displaying a timer that indicates an amount of time left of a predetermined time before the NL conversational system performs an automatic operation using results currently shown in the wizard control panel;
    determining when an input is received into the wizard control panel within the predetermined time, wherein the input updates the results displayed in the wizard control panel; and
    in response to determining that the input is received into the wizard control panel, submitting updated results based on the input, wherein the updated results modifies operation of the NL conversational system before the automatic operation is processed.

18. The system of claim 17, wherein displaying the wizard control panel, comprises: displaying text that is automatically recognized by an automatic speech recognition (ASR) component of the NL conversational system within at least one of the ASR elements of the wizard that is changeable.

19. The system of claim 17, wherein displaying the wizard control panel, comprises: displaying feedback within a user interface for the NL conversational system that is populated using the updated results.

20. The system of claim 17, wherein submission of the updated results further comprises transmitting a control action to manipulate an entity on the user's display.

* * * * *